DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED NOVEMBER 4, 1975

940 O.G. 6

T940,005

VERSATILE WATER/SOLVENT SOLUBLE POLYMER AND COATING COMPOSITION OF THE POLYMER

Joseph A. Vasta, Woodbury, N.J., assignor to E. I. du Pont de Nemours and Company, Wilmington, Del.

Continuation of application Ser. No. 263,761, June 19, 1972, which is a continuation-in-part of application Ser. No. 36,480, May 11, 1970, both now abandoned. This application Apr. 29, 1974, Ser. No. 464,897

Int. Cl. C08g *51/24*

U.S. Cl. 260—29.4 UA

No Drawing. 29 Pages Specification

A novel polymer which is soluble in water and in solvents that forms a high quality coating composition is the subject of this invention. The novel polymer comprises (1) an aromatic compound of the general formula

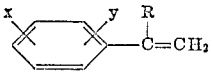

where $x$ and $y$ can be hydrogen, chlorine, bromine, or an alkyl group and R can be hydrogen or an alkyl group; (2) an acrylic ester, such as an alkyl methacrylate or an alkyl acrylate in which the alkyl group has 1–12 carbon atoms; (3) vinyl pyrrolidone; (4) hydroxy alkyl acrylic ester and (5) an ethylenically unsaturated carboxylic acid. Coating compositions formulated from this polymer, that has an unusual hydrophilic/hydrophobic balance, can be reduced to a spray viscosity with water or solvents which are considered not to be air pollutants which allows a manufacturer to comply with current pollution laws. The composition may also contain a thermosetting resin and be utilized in electrocoating processes. Also, the polymer forms coatings which are durable, grease resistant, scratch resistant, hard and adhere well to metal substrates, and are useful, for example, as appliance enamels.